Nov. 18, 1969  E. WEINSTEIN  3,479,085
SLIP COVER TYPE OF ARTICLE CARRIER
Filed Feb. 7, 1968  2 Sheets-Sheet 1
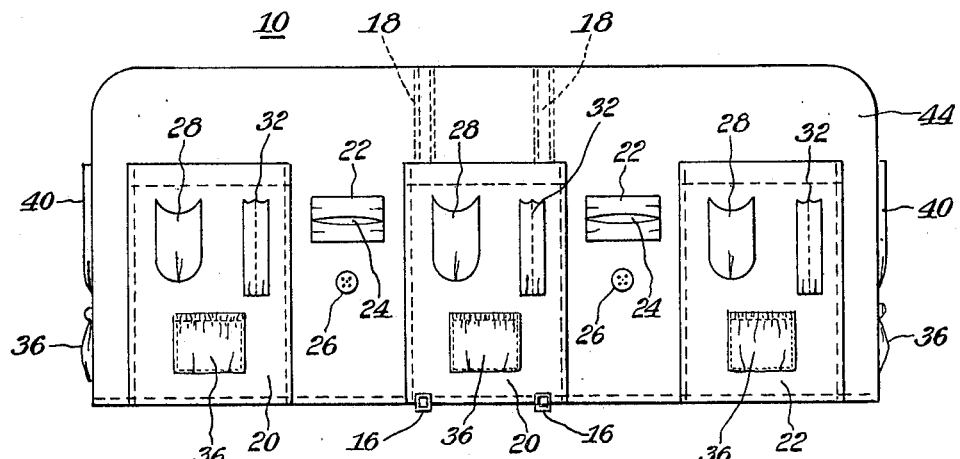
FIG. 1
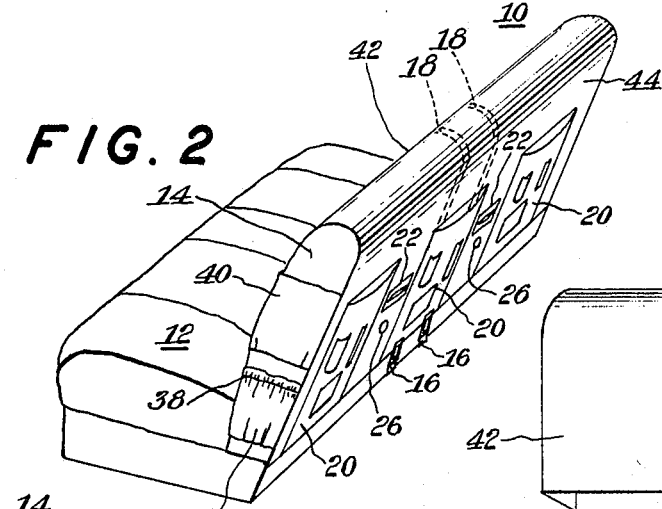
FIG. 2
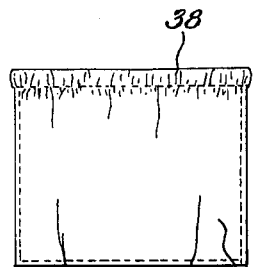
FIG. 7
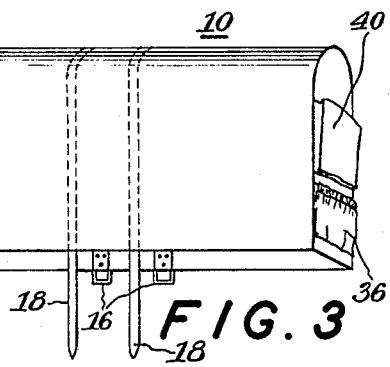
FIG. 3
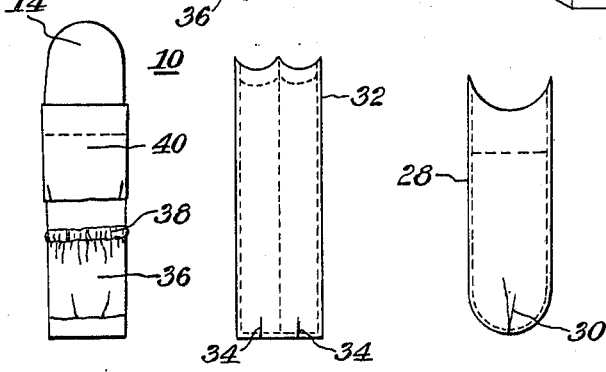
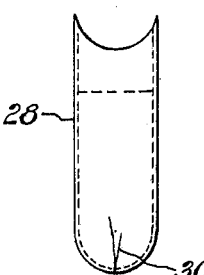
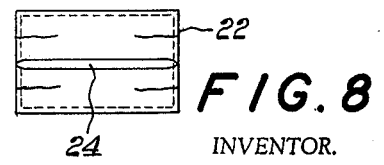
FIG. 8
FIG. 4  FIG. 5  FIG. 6
INVENTOR.
ELAINE WEINSTEIN Nov. 18, 1969  E. WEINSTEIN  3,479,085
SLIP COVER TYPE OF ARTICLE CARRIER
Filed Feb. 7, 1968  2 Sheets-Sheet 2

INVENTOR.
ELAINE WEINSTEIN
BY
Joseph P. Gastel
ATTORNEY

United States Patent Office 3,479,085
Patented Nov. 18, 1969

3,479,085
SLIP COVER TYPE OF ARTICLE CARRIER
Elaine Weinstein, 218 McKinley Ave.,
Kenmore, N.Y. 14217
Continuation-in-part of application Ser. No. 621,040,
Mar. 6, 1967. This application Feb. 7, 1968, Ser.
No. 710,423
Int. Cl. A47c *31/00, 7/62*
U.S. Cl. 297—219                4 Claims

ABSTRACT OF THE DISCLOSURE

An universal slip cover type of article carrier for mounting and demounting on the back of an automobile seat formed of a first flexible panel of substantially rectangular configuration which has opposite sides and opposite ends and which is folded over on itself so as to provide a front and a back, an elastic side panel having its edges sewn to each pair of adjacent edges of the front and back with said elastic side panels terminating short of said fold for leaving open spaces at said fold to permit said slip cover to snugly fit various corner configurations of automobile seat backs, a second panel of substantially rectangular configuration extending across the entire width of said back and being of a first height, a third substantially rectangular panel extending substantially across the entire width of said back and being of a second height which is less than said first height, first seams attaching said elastic panels and said second and third rectangular panels to said edges of said back, and a plurality of second seams extending substantially parallel to said first seams for dividing said second and third rectangular panels into a plurality of pockets, and buttons sewn on said back of removably holding disposable litter bags.

CROSS REFERENCE TO RELATED APPLICATION

The present application is a continuation-in-part of application Ser. No. 621,040, filed Mar. 6, 1967.

BACKGROUND OF THE INVENTION

The present invention relates to an improved universal slip cover type of article carrier for mounting and demounting on the back of an automobile seat.

In the past there has been no convenient way of coping with the clutter which normally accomplishes automobile travel. More specifically, children normally use games and other children's amusement devices, such as coloring books, magazines, and the like, during a trip. In addition, adults often use maps, magazines, newspapers, facial tissue boxes, and various and sundry other items. All of the foregoing items are used occasionally, and are then placed on the seat or on the floor. This results in cluttering the interior of the vehicle so that it is extremely difficult to find anything. In addition, litter bags are also used in vehicles. However, these litter bags are usually placed on the floor and in this position are susceptible to tipping and contributing to the overall mess. It is with a device which overcomes the foregoing clutter incidental to automobile travel that the present invention is concerned.

SUMMARY OF THE INVENTION

It is accordingly one important object of the present invention to provide a universal slip cover type of article carrier which easily can be mounted and demounted from the back of an automobile seat and which provides a plurality of different pockets for the storing of articles normally utilized during automobile travel, and which can be folded into a compact bundle so that it may be stored conveniently when not in use. A related object of the present invention is to provide an improved slip cover of the foregoing type which will fit all styles and all sizes of automobile back seat backs and therefore obviates the custom tailoring which is normally required in devices of this type.

Another object of the present invention is to provide an improved slip cover type of article carrier which provides a suitable base for mounting litter bags in a convenient out-of-the-way location where they are readily accesible.

A further object of the present invention is to provide an improved slip cover type of article carrier for mounting and demounting on the back of an automobile seat which is tailored in such a manner that it can be manufactured with a minimum of labor in that the various tailoring steps each serve a plurality of functions and thus the instant device can be manufactured relatively simply and easily and at a relatively low cost. Other objects and attendant advantages of the present invention will readily be received hereafter.

The improved universal slip cover type of article carrier of the present invention is adapted to be mounted and demounted from the back of an automobile seat and comprises a first flexible panel of substantially rectangular configuration having opposite sides and oposite ends and which is folded over on itself so as to provide a front and a back by causing the ends to lie in generally contiguous substantially parallel relationship and by causing the sides essentially to be doubled over on themselves so as to each form first and second substantially parallel side portions which terminate at a fold with said first side portions bordering the front of the slip cover and said second side portions bordering the back. Elastic panel means join the first and second side portions of each side to permit the article carrier to be snugly mounted on the back of various widths and thicknesses of automobile seats and these panels terminate short of the fold so as to provide spaces near the fold through which the various shaped corners of automobile seats can protrude, thereby providing a neat fit of the slip cover on different shapes of seat corners. Second and third substantially rectangular panels are sewn on the back of the slip cover by a pair of first seams which extend along the side portions of the back and these first seams attach the flexible elastic panels and the second and third panels to the back thereby performing the function of a plurality of seams. In addition, extensions of these first seams sew the elastic panel to the front of the slip cover. A plurality of second seams extend vertically across the back and the second and third panels to divide the second and third panels into a plurality of different sized pockets, considering that the second and third panels are of different heights. Buttons are sewn on the back for carrying disposable litter bags in a convenient, out-of-the-way location. The present invention will be more fully understood while the following portions of the specification are read in conjunction with the accompanying drawings wherein:

BRIEF DESCRIPTION OF THE DRAWINGS

FIGURE 1 is a rear elevational view of one embodiment of the slip cover carrier;

FIGURE 2 is a perspective view of the device of FIGURE 1 as installed on an automobile seat;

FIGURE 3 is a perspective view showing the front of the device;

FIGURE 4 is a side elevational view looking from the right of FIGURE 1;

FIGURE 5, 6, 7 and 8 are enlarged front elevational views of a variety of different pockets which are used on the device of FIGURE 1;

DESCRIPTION OF THE PREFERRED EMBODIMENTS

Figure 9:
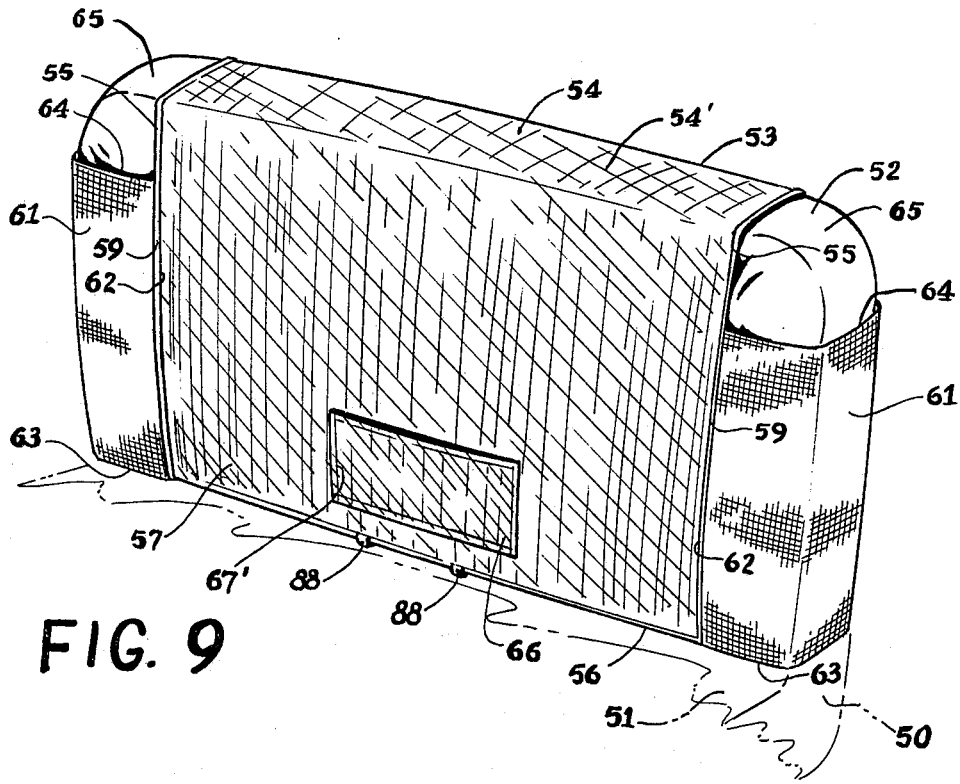
FIGURE 9 is a perspective view of the preferred carrier of the present invention mounted on an automobile seat and showing the front thereof.
Figure 10:
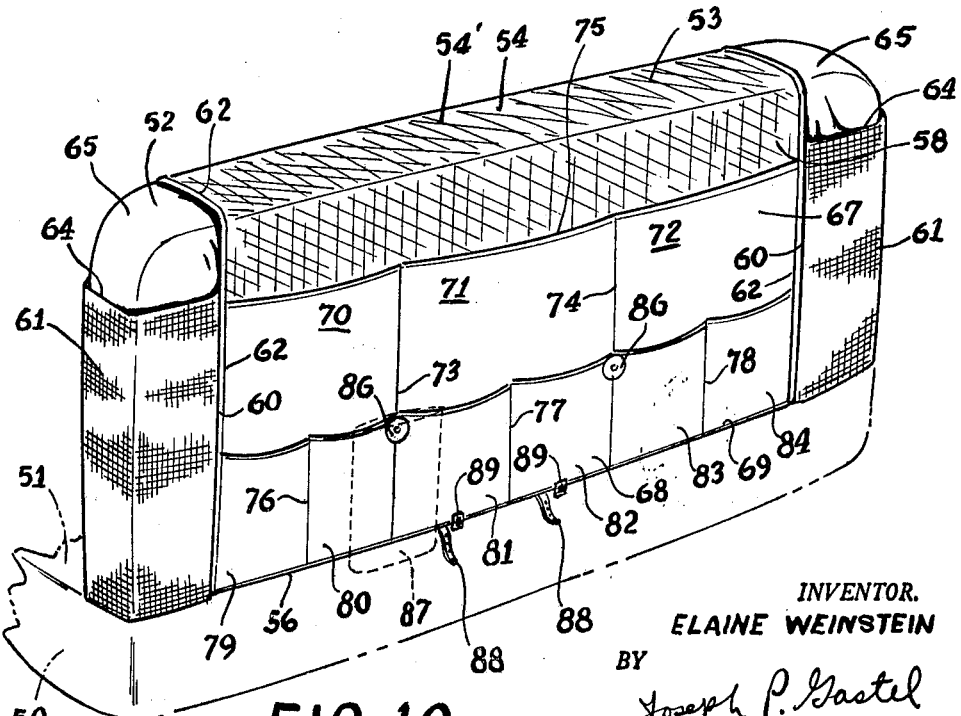
FIGURE 10 is a perspective view of the improved carrier of the present invention showing the rear thereof.

The preferred embodiment of the present invention is shown in FIGURES 9 and 10. As can be seen, an automobile seat 50 is shown having a seat portion 51 and a back portion 52 extending upwardly therefrom. The improved slip cover type of article carrier 53 of the present invention is mounted on back 52.

The article carrier 53 is made of a substantially rectangular flexible fabric panel 54 having opposed side edges 55 extending between opposed ends 56 and which is folded over on itself at fold 54' to provide a front 57 and a back 58. Side edges 55 are divided into side portions 59, which border the front 57, and side portions 60, which border the back 58.

To provide a snug fit on automobile seats of different widths and thicknesses on which the carrier 53 may be mounted, elastic side panels 61 are sewn to panel 54. In this respect, seams 62 attach the edges of elastic panels 61 to side portions 59 on the front of the seat cover and these same seams 62 continue along the sides of panel 54 and fasten the oposite edges of elastic panel 61 to the back. It thus can be seen that each single straight seam 62 effects the attachment of each panel 61 to panel 54. As can be seen from the drawings, the bottom edge 63 of each elastic panel is substantially in line with ends 56 of panel 54. This relationship can be changed if desired.

It is to be noted that the upper edges 64 of elastic panels 61 terminate short of the top or fold 54'. This permits corners 65 of seat 52 to be exposed, which obviates the necessity to tailor the slip over to fit different shapes of corners. In other words, since different makes and models of automobiles have different shapes of seat corners, by eliminating the corners on the slip cover, as shown, the instant cover is universal in that it will fit different seats having different shaped corners. Thus, the carrier 53 may be considered universal in that it fits various sizes and shapes of seats because of the use of elastic panels 61 which are essentially cut away to leave open spaces at the corners of the seats on which the carrier is mounted.

As can be seen from FIGURE 9, a pocket 66 is sewn by seam 67' to the front 57 of the carrier. This pocket is centrally located between the two front seat passengers and can conveniently carry maps or small packages, which are normally laid on the seat and which may fall down between the seat and the back. Additionally, pocket 66 is convenient for toll coins, parking lot tickets, and the like.

The main article carrying capacity of the instant carrier 53 is located on the back 58 in an out-of-the-way location and in a space which is normally clear for the reception of various articles which may be used in the vehicle. In addition, it is to be especially noted that the article carrying area is convenient both to the front and rear seat occupants.

In accordance with the present invention, a second fabric panel 67, of less height than back 58, but of substantially the same width, is sewn to back 58 by the same spaced seams 62 which sew elastic panel 61 to back 58. In addition, a panel 68 of less height than panel 67 and of approximately the same width as back 58 is placed across back 58 and secured thereto at its opposite ends by the same seams 62. It can thus be seen that panels 67 and 68 are attached to back 58 by means of the same spaced seams 62 which are used to secure elastic panels 61 to the back, thereby minimizing the labor involved in making the instant device.

A seam 69 extends horizontally across back 58 in contiguous relationship to end 56 for providing bottoms to the pockets formed from panels 67 and 68. Panel 67 is divided up into three pockets 70, 71 and 72 by vertical seams 73 and 74 which extend from the top 75 of panel 67 to horizontal seam 69. In addition, seams 76, 77 and 78 divide panel 68, in combination with seams 73 and 74, into pockets 79, 80, 81, 82, 83 and 84, the bottoms of these pockets being formed by seam 69. The outsides of pockets 79 and 84 are determined by the above mentioned seams 62 which perform the plurality of other above-mentioned functions. Seams 62 and 73 and 74 extend through back 58 and panels 67 and 68. However, seams 76, 77 and 78 extend through only panels 67 and 68. Thus, pockets 70, 71 and 72 are unobstructed for their entire depth all the way down to seam 69. Panels 67 and 68 may be formed by folding a single piece of material upwardly at seam 69.

It can readily be seen that various types of larger articles can be stored in pockets 70, 71 and 72 and smaller articles can be stored in pockets 79–94. The exposed ends of the various pockets and of the sides of the cover 54 are suitably hemmed so as to provide finished edges, seams 62 functioning to provide hems at the folds 54' between edges 64 of the elastic side panels 61. Other hems such as at ends 56 and on the elastic and on the free edges of the pockets are not numbered.

In addition to functioning as a carrier for various articles commonly used in an automobile, the instant carrier 53 carries buttons 86 which can be used to suspend plastic litter bags 87 by means of buttonholes in the latter. The litter bags are convenient to both the front and rear passengers and are held in an upright position on the back of the front seat, in an out-of-the-way location where there is little likelihood of their being torn from their mounting and where they will not tip and spill. These litter bags can be removed as they become full.

If desired straps 88 may be used to anchor the front of the carrier to the seat. Straps 88 may have one end attached to the front 57 as shown and may join with buckles 89 attached to the bottom of back 58 after having been pulled through the space between upper cushion 52 and lower cushion 51. These can be identical to elements 16 and 18 shown in FIGURE 3. Alternatively, any other type of suitable fastening arrangement may be used for holding front end 56 against pulling up in use and such arrangement may consist of suitable pin members, hooks, or adhesive tape. However, it is to be noted that straps 88 and buckles 89 are preferably not used in the embodiment of FIGURES 9 and 10, but may be incorporated only if desired.

While panels 54, 67 and 68 have been described as being made of fabric, it will be understood that they may be made of plastic or any other suitable material, and while panels 61 have been described as elastic, they are elasticized fabric but may be made of any stretchable material.

The non-preferred embodiment of the present invention is shown in FIGURES 1 through 8. Referring now to the drawings, a hollow plastic or clothlike or fabric cover 10 is adapted to fit detachably over the rearwardly inclined back of an automobile seat 12. Cover 10 has front, rear and side surfaces identified respectively at 42, 44 and 14.

Belt buckles 16 secured to the inner portion at the bottom edge of surface 12 are secured to straps 18 sewn to the cover which extend upward, over the top of the seat back and, hidden from view, down the front surface and along the exposed bottom surface of the seat back to the buckles to hold the cover in place.

Three large spaced apart sections 20 are sewn with large stitches to the cover, each space between sections carrying a pocket 22 having a horizontal lip 24 and adapted to receive pocket packs of tissues and the like. Disposed below each pocket 22 is a button 26 to hold disposable litter bags.

Each section has a first pocket 28 with no stitches and an inverted pleat 30, a vertically elongated pocket 32 with a shallow pleat 34, and a rectangular pocket 36 with top mounted elastic 38.

A similar such pocket 36 is secured to each side surface 14 with a short pocket 40 similar to pocket 32 and disposed above pocket 36.

Thus, in use, much additional storage capacity for small items is obtained, while at the same time the front surfaces of the seats are unobstructed.

It can thus be seen that the improved slip cover type of article carrier is manifestly capable of achieving the above enumerated objects and while preferred embodiments of the present invention have been disclosed it will be appreciated that it is not limited thereto but may be otherwise embodied within the scope of the following claims.

I claim:

1. A universal slip cover type of article carrier for mounting and demounting on the back of an automobile seat comprising first flexible panel means of substantially rectangular configuration having opposite sides and opposite ends folded over on itself so as to provide a front and a back by causing said ends to lie in generally contiguous substantially parallel relationship and by causing said sides essentially to be doubled over on themselves so as to each form first and second substantially parallel side portions which terminate at a fold which lies between and is parallel to said ends with said first side portions bordering said front and said second side portions bordering said back, expansible means joining said first and second side portions of each side so as to mount said article carrier snugly on said back of said automobile seat, and second flexible panel means affixed to said back in a plurality of locations to provide a plurality of pockets extending across said back between said opposed sides, said expansible means comprising elastic panels sewn between said first and second portions of each of said opposed sides and terminating short of said fold so as to leave a completely open space on each side proximate said fold to permit the corners of the seat to project therethrough to provide a universal fit with seats of different shapes.

2. A universal slip cover type of article carrier for mounting and demounting on the back of an automobile seat as set forth in claim 1 including means for securing said front end relative to said seat to prevent riding up in use when the loading of said pockets pulls said back downwardly.

3. A universal slip cover type of article carrier for mounting and demounting on the back of an automobile seat as set forth in claim 1 wherein said second panel means includes second and third flexible panels of substantially rectangular configuration sewn to said back by first vertical seams lying substantially parallel to said second side portions and generally proximate said second side portions, second substantially vertical seams lying substantially parallel to said first seams and between said first seams for dividing said second and third panels into a plurality of pockets, with said second panel extending for a longer distance along said second side portions than said third panel to provide first and second series of pockets of different depths.

4. A universal slip cover type of article carrier for mounting and demounting on the back of an automobile seat as set forth in claim 3 wherein said first vertical seams secure said back proximate said second portions to first sides of said elastic panels and to said second and third panels.

References Cited

UNITED STATES PATENTS

| | | | |
|---|---|---|---|
| 1,304,753 | 5/1919 | Dwyer | 297—219 X |
| 1,495,220 | 5/1924 | Carroll. | |
| 1,521,897 | 1/1925 | Martin. | |
| 1,684,232 | 9/1928 | Levit. | |
| 1,777,275 | 9/1930 | Goodman | 297—188 X |
| 2,223,532 | 12/1940 | Sallop | 297—191 X |
| 2,771,939 | 11/1956 | Trubitt | 297—219 |
| 2,778,412 | 1/1957 | Trubitt | 297—224 |
| 2,920,670 | 1/1960 | Mohlmann | 206—19.5 |
| 3,295,887 | 1/1967 | Bacon | 297—188 |

JAMES T. McCALL, Primary Examiner

U.S. Cl. X.R.

297—191